United States Patent
Pecenak et al.

(10) Patent No.: US 11,966,989 B2
(45) Date of Patent: Apr. 23, 2024

(54) ROBUST AND FAST DESIGN OF MICROGRIDS, DER SYSTEMS, AND OTHER ENERGY SYSTEMS USING STAGED HYBRID INVESTMENT PLANNING

(71) Applicant: Xendee Corporation, San Diego, CA (US)

(72) Inventors: Zachary K. Pecenak, San Diego, CA (US); Michael Stadler, San Diego, CA (US); Patrick James Mathiesen, Minneapolis, MN (US); Kelsey T. Fahy, Vista, CA (US)

(73) Assignee: Xendee Corporation, La Jolla, CA (US)

( * ) Notice: Subject to any disclaimer, the term of this patent is extended or adjusted under 35 U.S.C. 154(b) by 608 days.

(21) Appl. No.: 17/210,308

(22) Filed: Mar. 23, 2021

(65) Prior Publication Data

US 2021/0295456 A1    Sep. 23, 2021

Related U.S. Application Data

(60) Provisional application No. 62/993,198, filed on Mar. 23, 2020.

(51) Int. Cl.
G06Q 50/06 (2012.01)
G06F 30/20 (2020.01)

(52) U.S. Cl.
CPC ............. *G06Q 50/06* (2013.01); *G06F 30/20* (2020.01)

(58) Field of Classification Search
CPC ................................ G06F 30/20; G06Q 50/06
USPC ....................................................... 700/291
See application file for complete search history.

(56) References Cited

U.S. PATENT DOCUMENTS

| 11,204,591 | B2* | 12/2021 | Devi | G06F 9/5072 |
| 11,398,000 | B2* | 7/2022 | Shi | G06N 20/00 |
| 2013/0079943 | A1* | 3/2013 | Darden, II | G06F 1/30 700/297 |
| 2015/0057821 | A1* | 2/2015 | Nasle | G06Q 10/04 700/291 |
| 2019/0155234 | A1* | 5/2019 | Devi | H02J 3/381 |
| 2019/0311286 | A1* | 10/2019 | Stadler | G06Q 50/06 |
| 2020/0334609 | A1* | 10/2020 | Pecenak | H02J 3/003 |
| 2020/0372588 | A1* | 11/2020 | Shi | G06Q 50/06 |

FOREIGN PATENT DOCUMENTS

| CA | 3078924 A1 * | 10/2020 | G06N 5/02 |
| CN | 106570774 A * | 4/2017 | |
| CN | 112348384 A * | 2/2021 | G06N 3/0445 |

* cited by examiner

*Primary Examiner* — Ronald D Hartman, Jr.
(74) *Attorney, Agent, or Firm* — Fish & Richardson P.C.

(57) ABSTRACT

In an embodiment, a method comprises: obtaining input data including a plurality of parameters related to an energy system design; reducing the input data to a subset of the input data; in a first stage: feeding the subset of input data into a reduced version of a model for estimating an energy system configuration; estimating, using the reduced version of the model, a first energy system configuration and a lower bound solution for the first energy system configuration based on the subset of input data; and in a second stage following the first stage: feeding the input data and the lower bound solution into a full version of the model; and estimating, using the full version of the model, a second energy system configuration based on the input data and the lower bound solution.

1 Claim, 8 Drawing Sheets

Example of the TSP matrix used for the first pass of the method with the reduced dataset

|  | Jan | Feb | Mar | Apr | May | Jun | Jul | Aug | Sep | Oct | Nov | Dec |
|---|---|---|---|---|---|---|---|---|---|---|---|---|
| Week | 19 | 17 | 20 | 17 | 20 | 19 | 18 | 20 | 18 | 19 | 19 | 18 |
| Weekend | 9 | 8 | 8 | 10 | 8 | 8 | 10 | 8 | 9 | 9 | 8 | 10 |
| Peak | 3 | 3 | 3 | 3 | 3 | 3 | 3 | 3 | 3 | 3 | 3 | 3 |
| Day1 | 0 | 0 | 0 | 0 | 0 | 0 | 0 | 0 | 0 | 0 | 0 | 0 |
| Day2 | 0 | 0 | 0 | 0 | 0 | 0 | 0 | 0 | 0 | 0 | 0 | 0 |
| ... | ... | ... | ... | ... | ... | ... | ... | ... | ... | ... | ... | ... |
| Day30 | 0 | 0 | 0 | 0 | 0 | 0 | 0 | 0 | 0 | 0 | 0 | 0 |
| Day31 | 0 | 0 | 0 | 0 | 0 | 0 | 0 | 0 | 0 | 0 | 0 | 0 |

FIG. 5

Example of the TSP matrix used for the second pass of the method with the full dataset

|         | Jan | Feb | Mar | Apr | May | Jun | Jul | Aug | Sep | Oct | Nov | Dec |
|---------|-----|-----|-----|-----|-----|-----|-----|-----|-----|-----|-----|-----|
| Week    | 0   | 0   | 0   | 0   | 0   | 0   | 0   | 0   | 0   | 0   | 0   | 0   |
| Weekend | 0   | 0   | 0   | 0   | 0   | 0   | 0   | 0   | 0   | 0   | 0   | 0   |
| Peak    | 0   | 0   | 0   | 0   | 0   | 0   | 0   | 0   | 0   | 0   | 0   | 0   |
| Day1    | 1   | 1   | 1   | 1   | 1   | 1   | 1   | 1   | 1   | 1   | 1   | 1   |
| Day2    | 1   | 1   | 1   | 1   | 1   | 1   | 1   | 1   | 1   | 1   | 1   | 1   |
| ...     | ... | ... | ... | ... | ... | ... | ... | ... | ... | ... | ... | ... |
| Day30   | 1   | 0   | 1   | 1   | 1   | 1   | 1   | 1   | 1   | 1   | 1   | 1   |
| Day31   | 1   | 0   | 1   | 0   | 1   | 0   | 1   | 1   | 0   | 1   | 0   | 1   |

ROBUST AND FAST DESIGN OF MICROGRIDS, DER SYSTEMS, AND OTHER ENERGY SYSTEMS USING STAGED HYBRID INVESTMENT PLANNING

CROSS-RELATED APPLICATION

This application claims the benefit of U.S. Provisional Patent Application No. 62/993,198, filed on Mar. 23, 2020, for "Robust and Fast Design of Microgrids, DER systems and Other Energy Systems Using A Staged Hybrid Investment Planning Method," which provisional patent application is incorporated by reference herein in its entirety.

TECHNICAL FIELD

The subject matter of this application relates generally to cloud computing and computer information systems applications for energy generation and usage planning.

BACKGROUND

Planning methods, which use optimizers, simulators, or models are a necessity for microgrid, Distributed Energy Resources (DER) design or any other energy system. Hereafter, a microgrid refers collectively to a microgrid, DER, or other energy system. Hereafter, a model refers to an optimizer, simulator, or model which is used as part of the planning method. These models produce a solution, which refers to technical and economic design parameters of a microgrid such as the size, selection, operation, and placement of disparate DER or infrastructure equipment, the levelized cost of energy (LCOE), net present value, capital and operation expenses, amongst many others.

Typically, these planning models take high resolution metered, or simulated data profiles, and model the behavior of DER to find the lowest cost and most reliable configuration. However, as the complexity of the model increases, so does the runtime of the model. Most models, which rely on data sets with resolution of one-hour (e.g. 8,760 points for one considered year), 30 minutes (e.g. for one considered year 17,520 points), 15 minutes (e.g. 35,040 points for one considered year), or lower, must be overly simplistic, or their runtimes will likely be on the order of hours to days. For example, existing models have been shown to take hours to days to complete a single planning run.

Modelers have tried to overcome this by applying simplifications to the model, where equations, constraints, or input data are modified to represent the original model and input data in a simpler form. These models can represent the high resolution physical or mathematical model which can, e.g., determine the cost savings by applying a new energy system or microgrid. Among others, goals of such a model could include assessing the CO2 emissions reduction, lowest LCOE, or most reliable configuration. In contrast to the original model, the simplified approaches try to estimate the DER configuration and optimal capacities for the microgrid or energy system, based on reduced data sets as well as simplifications in the mathematical and physical model. Thus, such simplified models are not directly linked to the original planning model. For data simplification, this is performed by apply a clustering, aggregation, or down-sampling technique, amongst others, to the data, making assumptions about the best approach to reduce the dataset.

The conventional planning model approach described above can produce time savings, and for many analyses produce negligible deviations in objective function (e.g. design costs or annual CO2 emissions) of the optimization analyses. However, these models can become insufficient for highly stochastic datasets, since down-sampling the data provides a low degree of representation. Further, the simplified models are unable to provide transparency into the operation of the microgrid on the annual or multi-year data set that is being used for the planning effort since they can remove time-dependencies and only work with a subset of the data.

To provide transparency into the operation of the selected DERs in the microgrid or energy system, parameters optimized in the simplified and down-sampled model can be introduced and fixed in the full original model. Though, this approach can solve the transparency issue, it does not guarantee optimality of the DER or energy technology solutions for the full original solution, especially if the models are not well aligned, meaning if critical characteristics of the full model have been removed in the simplified model (e.g., seasonal storage effects).

More importantly, there is no guarantee that the solution of the simplified model will produce a feasible result when forced into the full model. That is, the DER selected in the reduced model might violate some of the constraints (e.g. energy balance) required for a solution in the full original model. For example, Microgrids which enter an islanded configuration, where there is no connection to external energy providers, rely on the DER selected to meet the energy demand exactly. If the DER are not sized correctly in the simplified and down-sampled model, the islanded microgrid being simulated in the full original model will not be able to balance the supply with the demand. This renders the results of the simplified model useless, since it produces a microgrid which will fail when deployed in the field.

There is no existing method which optimizes the configuration of DER in a microgrid or energy systems in a single method and model which guarantees the feasibility of the result in situations with no utility power availability, which can be run in an acceptable amount of time and in an automated way.

SUMMARY

The embodiments disclosed herein are directed to a fast and robust design of microgrid design, DER, or energy design or expansion that uses optimization, simulation, or modeling and considers cost calculations, emission calculations, technology investments and operation in a complete computational method. In an embodiment, the computing method is deployed on a network (cloud computing platform), or desktop application, that can be accessed by a variety of stakeholders (e.g., investors, technology vendors, energy providers, regulatory authorities). In an embodiment, the planning method implements at least one of artificial intelligence (AI), machine learning, forecasting, or historical data to estimate various planning parameters with resolution of microseconds to hours for one to an infinite number of years.

The disclosed hybrid method solves the optimization problem by employing the same underlying problem formulation model two times consecutively. The problem formulation solved in the method is hereafter referred to as the model. The method is holistic and automatic, requiring no outside intervention from the user, other than specifying the input data that the method should consider as part of the microgrid design. In a first stage, the method reduces the input data to a subset of the input data and solves the problem formulation to provide an estimate of the optimal DER or energy configuration. The estimated DERs or energy configuration provide a starting point for a second stage which includes a second solve of the model using the original full set of input data. The second state uses the full model and full dataset. This two stage approach will provide DER and energy solutions that comply with the original input data provided and provide feasible solutions in faster times than existing methods and technologies.

This hybrid method takes advantage of a reduction in the solution space of possible DER solutions and combinations the solver model must consider by using a reduced model to approximate the solution to the microgrid design, producing significant time savings. The model produces highly accurate results as the approximate solution provides only a lower bound on the solution, and the model can adapts the approximate solution further in the second stage to provide an energy and DER technology mix that complies with the original input data and requirements, and eliminates energy shortfalls resulting from the first stage (reduced/simplified model). This results in significantly reduced solution times and provides solutions that will satisfy the original input data.

First, the method examines the input data, analyzing the resolution and characteristics of time-series input files. Next an automated down-sampling, aggregation, or clustering technique is applied to the data, to turn the time-series into representative time-step data points which represent the original model. The accuracy of the solution depends on the degree to which the reduced time-steps represent the original input data. Thus, it is important that the automated technique accurately captures the demand peaks, and seasonal/diurnal energy consumption patterns provided for the energy system or microgrid. The time-steps can take the form of, but are not limited to, a subset of hourly resolution daily profiles, which represent typical days in a month. An example of a data reduction technique is described in further detail below.

Figure 5:
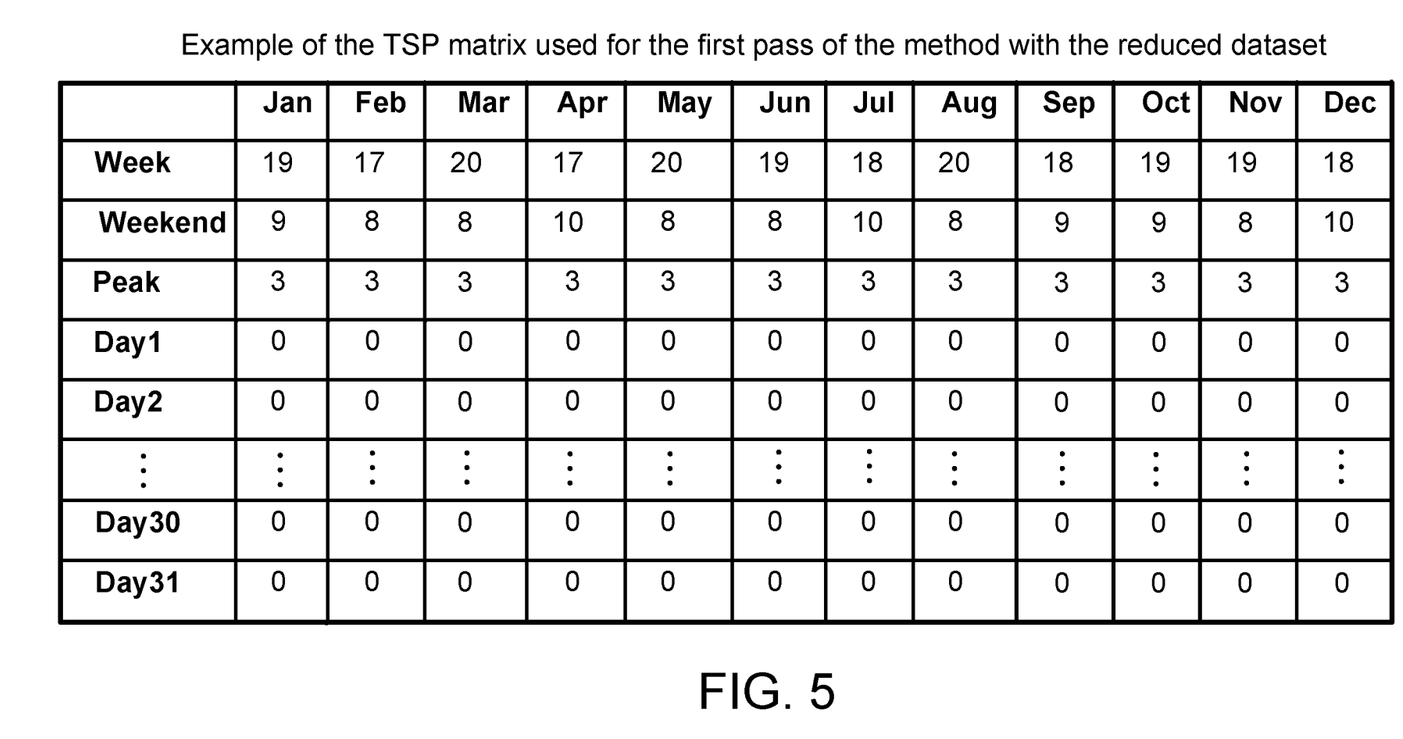
FIG. 5 is an example of the TSP matrix when optimizing the model considering the reduced data set, as is done in ES 101 of system 100, according to an embodiment.
Figure 6:
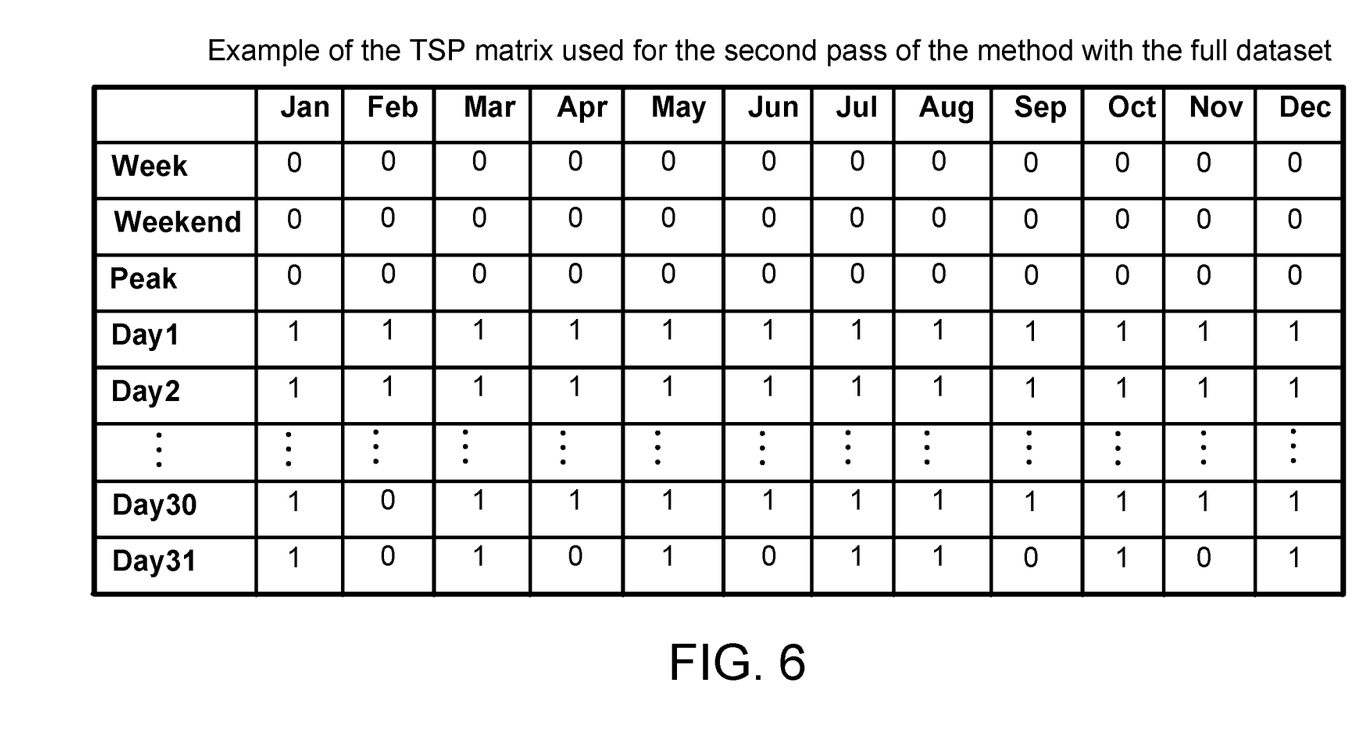
FIG. 6 is an example of the TSP matrix when optimizing the model considering the full data set, as is done in BS 104 of system 100, according to an embodiment.

Based on the reduced time-step profiles, a projection matrix (See, e.g., FIGS. 5 and 6] is created to relate the number of time steps the down-sampled data considers to their frequency in the optimization of the first stage (see FIG. 5). This is used to project back to the time horizon of the full time-series (typically one year or multi-years). The matrix informs the model of which time-steps to consider as part of its solution and this is what differentiates the two-stages of the method.

The first stage of the model is then performed considering the reduced time-series data, and all other non-timeseries data to produce a lower-bound solution for optimal DER, Microgrid technology, or energy technology investments. The lower bound solution is the DER sizing and selection, which is obtained by solving the full model with the reduced dataset. The projection matrix informs the model which timesteps to consider as part of the solution. This first stage is hereafter also referred to as the estimating stage (ES).

The recommendation from the ES is used to inform the energy and power capacity constraints of the full optimization, which were based on user specifications in the ES. Capacity constraints are the upper and lower bounds of investment in the solution space of the model. The DER and energy capacity constraints from the ES are treated as a minimum investment.

The result data from ES is then transferred into the second stage, also called the balancing stage (BS), considering the original timeseries profiles and the recommended DER investment capacities from ES as a minimum investment constraint, reducing the possible solutions space and runtime. The projection matrix is modified to represent the timesteps present in the original time-series data. This step is described in further detail below.

Finally, the suite of results taken from the BS stage are recorded and presented as the final recommendation for DER or energy technology investment, placement, and operation within the microgrid, DER project, or energy project as well as project economics and investment schedule over the considered time horizon (e.g. year or multi-years) of the project, amongst other recommendations.

In an embodiment, a method comprises: obtaining input data including a plurality of parameters related to an energy system design; reducing the input data to a subset of the input data; in a first stage: feeding the subset of input data into a reduced version of a model for estimating an energy system configuration; estimating, using the reduced version of the model, a first energy system configuration and a lower bound solution for the first energy system configuration based on the subset of input data; and in a second stage following the first stage: feeding the input data and the lower bound solution into a full version of the model; and estimating, using the full version of the model, a second energy system configuration based on the input data and the lower bound solution.

DESCRIPTION OF DRAWINGS

FIG. 2. Shows significant runtime savings when the staged hybrid method is performed.

The solid line curve is the ES model only and the dotted line curve is the hybrid method. The ES method shows the error when only the reduced data (stage one) is considered and considering stage 2 almost reduces the error to zero. However, if the ES portion of the hybrid solution selects a suboptimal solution, it might not be possible to exactly match the solution of the BS only (see MG3-1, MG3-2). For example, if the stage 1 (ES) optimal solution selects 4 natural gas generators only, while the benchmark B S-only solution chooses instead a combination of energy storage and solar PV, it might not be possible to recover to the exact same objective function when sizing again in the second stage (BS).

DETAILED DESCRIPTION

Figure 1:
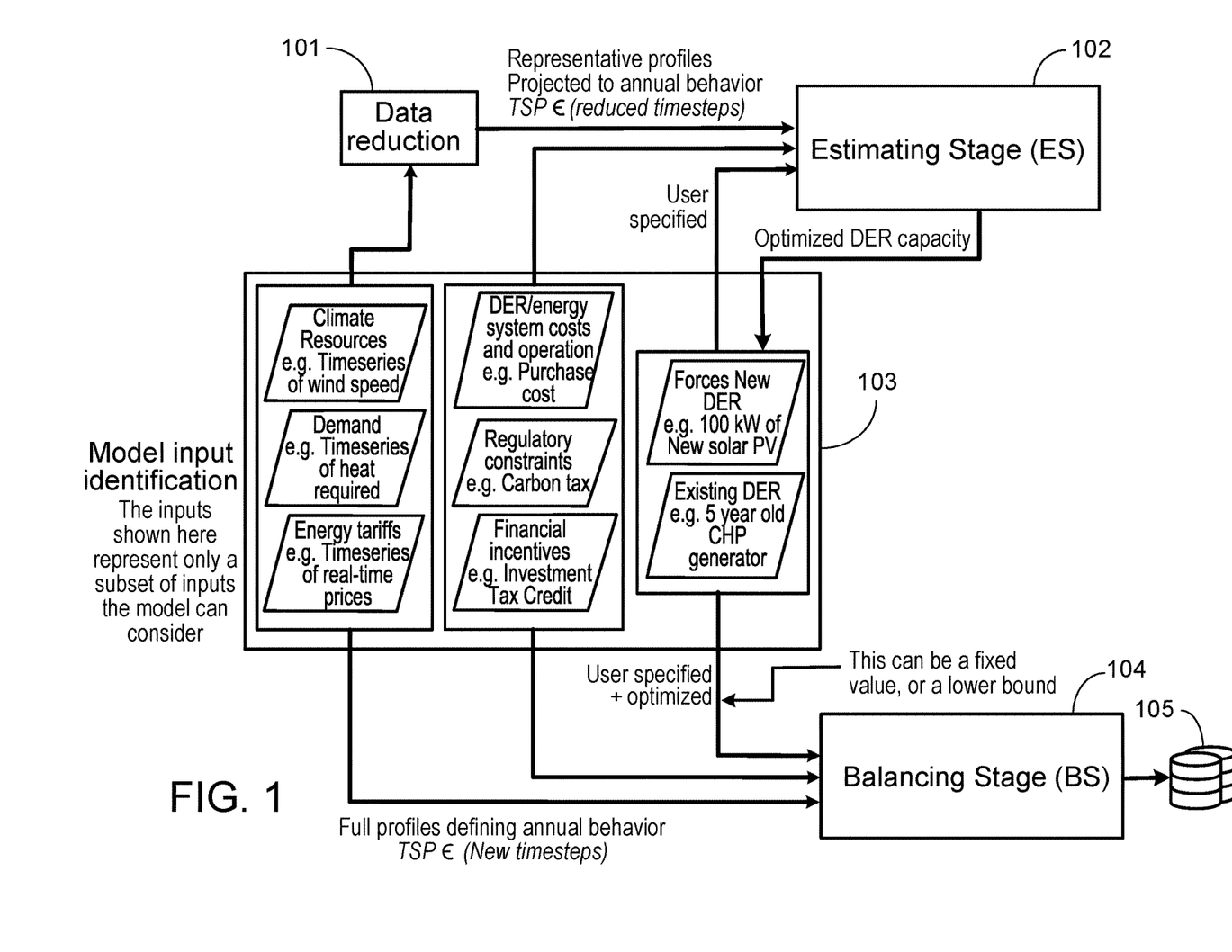
FIG. 1. shows a conceptual block diagram of a two-stage hybrid planning system for a microgrid, DER, or other energy system design and planning problems, and introduces the flow of information, according to an embodiment.
Figure 2:
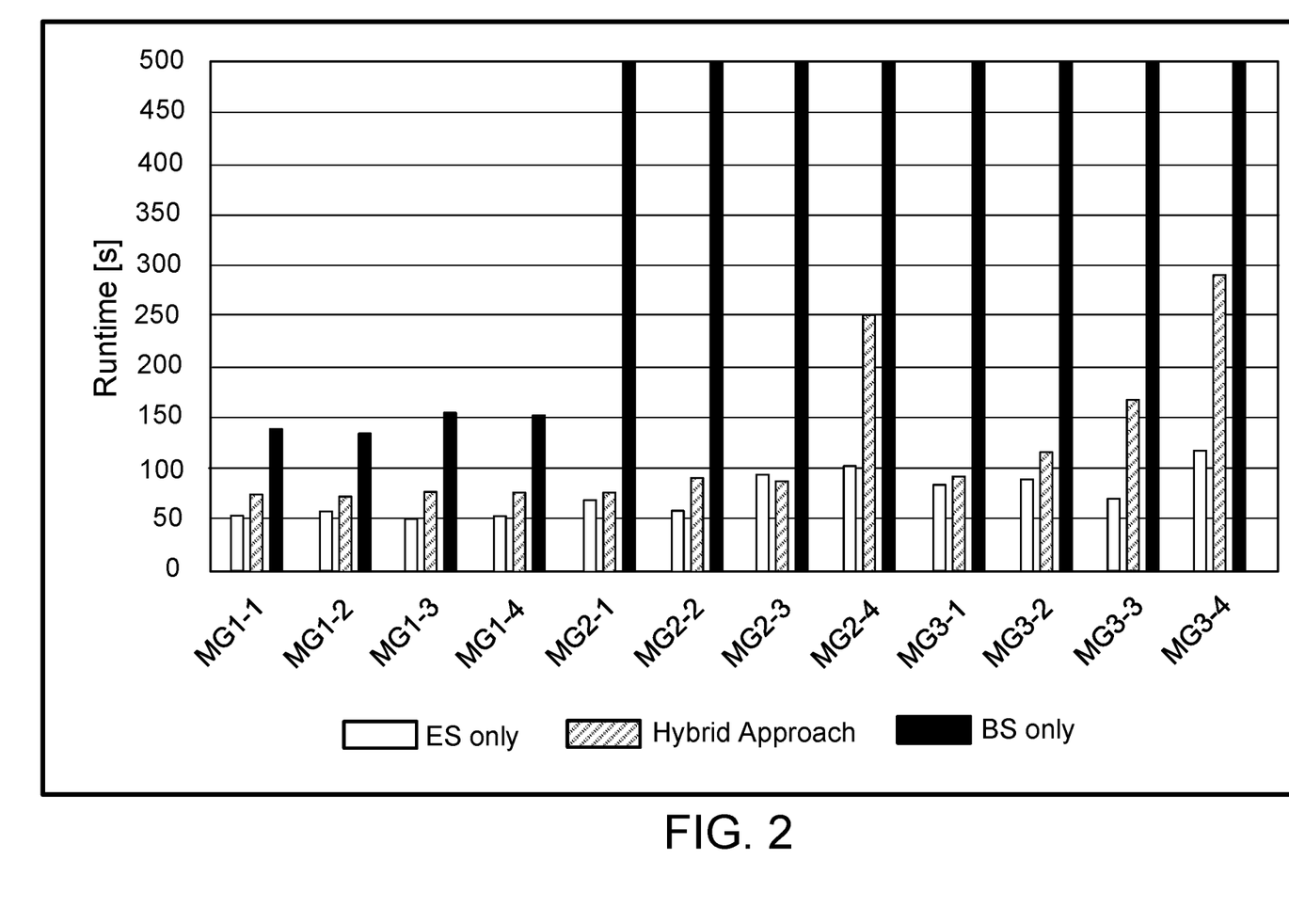
FIG. 2 is an example plot of runtime for the staged hybrid system of FIG. 1 on several different test microgrid design projects, subject to different operational constraints (e.g. sale allowed to the utility or multiple energy demands as heating or electricity), according to an embodiment. The solid bars represent the runtime for only the ES model runtime. The hatched bars represent the runtime when the full hybrid method is carried out. The checkered bars show the runtime if only the BS is performed, without the solution space reduction and no data reduction.
Figure 3:
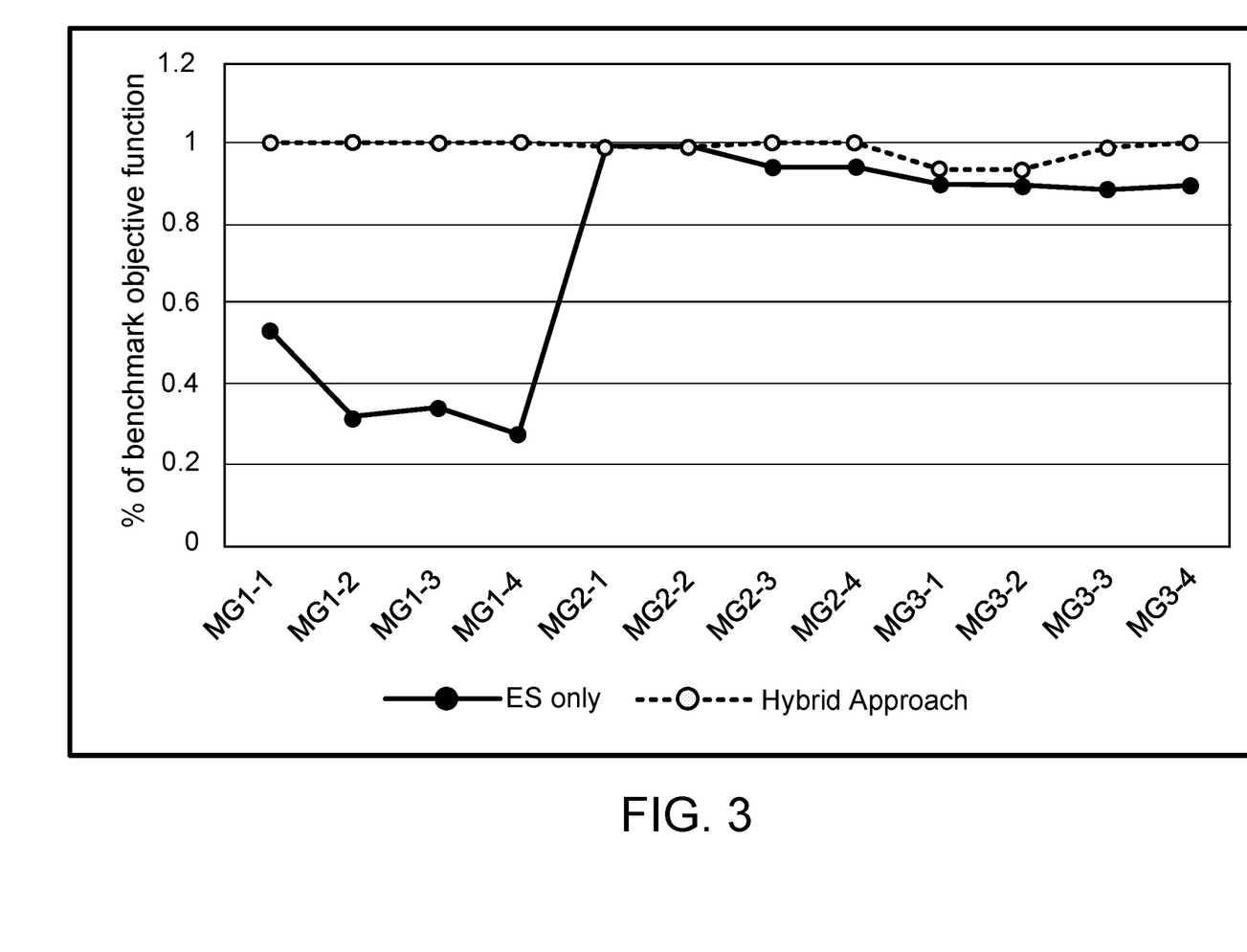
FIG. 3 is a graph that shows the difference between the total annual energy costs of the optimized energy system (the objective function) of the hybrid method and the ES only, as a percentage of the BS only without solution space reduction, according to an embodiment.

FIG. 1 is a conceptual block diagram of a planning system 100 for an adaptive hybrid microgrid, DER, or other energy system, according to an embodiment. System 100 includes data reduction module 101, estimating stage (ES) 102, model input identification state 103, balancing stage 104 and database(s) 105. The planning system 100 determines microgrid, DER, and energy system designs for a particular site, place, building, or geographic region under consideration by a stakeholder (hereinafter collectively referred to as a "facility") for one to multiple years. The planning input parameters include but are not limited to: technology mix, costs, CAPEX, OPEX, NPV, IRR, return on investment (ROI), and environmental impact. The system 100 can be implemented using a cloud-based computing platform, where stakeholders access the platform through a network (e.g., the Internet) using a desktop computer and/or mobile device, or through a downloadable desktop application.

In an embodiment, the hybrid method used to solve the techno-economic planning can include two or more linear or non-linear cascaded solvers, such as simulation, linear programming (LP) optimization, or modeling. The solvers can be stochastic or deterministic in nature and the techno-economic model can consider also non-linear aspects As used herein, a "power grid" is a network of power providers and consumers that are connected by transmission and distribution lines and operated by one or more control centers. As used herein a "microgrid" or "minigrid" is a group of interconnected loads and DER systems within defined electrical boundaries that act as a single controllable entity with respect to the power grid. A microgrid/minigrid can connect and disconnect from the power grid to enable it to operate in both grid-connected or island-mode. As used herein, "DER" systems are small-scale power generation or storage technologies (typically in the range of 1 kW to 10,000 kW) used to provide an alternative to, or an enhancement of, a traditional power grid. Microgrid can also include heat, cooling, and other forms of energy delivery. The discussed method can be applied to the power grid, microgrid, minigrid, or other forms of DERs.

The method employs two main approaches to data gathering: 1) a forecasting approach which can be from AI, machine learning, statistical, or deterministic approaches; and 2) user specified or forecasted estimated historic and future values. The AI used in the method can include one or more formal methods (e.g., one or more mathematical models) or one or more machine learning algorithms (e.g., one or more multilayer convolutional neural networks).

The method considers, among other inputs, times series data for demand, climate resources, and/or utility tariff structures, as well as static inputs such as DER and infrastructure capital and operational costs and operating characteristics, regulatory and financial constraints, utility connection availability, as well as a definition of the generators existing and forced DER already present on the site.

General Approach

The effectiveness of the method comes from the approximation of a solution gained by solving the problem formulation in the ES 102 with simplified input time-series data. The ES solution, which is provided to the BS 104 significantly reducing the solution space of the problem, which has the most significance to model run-time. The method allows the model to adapt the recommendation further, to increase accuracy and guarantee feasibility.

Referring to FIG. 1, the system 100 can be broken down into several steps. First, the required data must be provided or generated for the analysis. The input data 103 can be user defined, or where needed, generated from an AI-based or stochastic forecasting techniques. The input data 103 includes, but is not limited to: time-series data representing the site demand, weather conditions, and price schedules that change with time, in addition to static (non-time-series) inputs such as site constraints, DER operating characteristics and costs, financial incentives, on-site existing DER's and any DER capacities that should be forced into the model.

Next, the system 100 examines the input data, analyzing the resolution and characteristics of time-series input files. The time-series input data is reduced by data reduction module 101 to create a representative sub-set of data to model the energy system. The data-reduction can be performed using AI-based, stochastic, clustering, or aggregation techniques. The technique is performed in a seamless and automated manner, without user input. The reduced data is composed of time-steps which may not necessarily be present in the original data. For example, if several days are aggregated into a single representation, the hours in that representative day are the considered time steps. The time-steps can take the form of, but are not limited to, a subset of hourly resolution daily profiles, which represent typical days in a month.

An example of a data reduction technique is aggregation of the data into three peak-preserving representative days, a typical peak, week, and weekend day profile. Distinct week and weekend profiles are needed to capture variations in time-of-use energy rates, while the peak day captures the monthly demand charges. The week and weekend profiles are created by binning all days into two groups, based on if they occur on a weekday (Mon-Fri) or a weekend (Sat, Sun) and taking the average of the load across each hour in each bin. The peak day is an artificial day, which is created by searching across all the days in a month (one bin), and selecting the peak demand at each hour. This method ensures that demand peaks are preserved in the down-scaled representative days. All other time-series inputs, such as ambient temperature, solar irradiance, and wind power potential, are considered uncorrelated to the load profile, and instead are represented by a single typical day (i.e. one 24-hour profile each month).

To relate the down-sampled data to an annual operational equivalent, a time-step projection matrix (TSP) is created, which indicates the frequency a given time step present in the reduced data set will occur in an annual equivalent. Note the TSP matrix does not need to consider timesteps which were present in the original time-series, rather it can expand to include any time-step used to represent the data. The TSP matrix is described as part of the problem formulation below and an example TSP matrix is shown in FIGS. 5 and 6.

The reduced data is input into ES 102. An approximate microgrid design is determined considering the down-sampled time-series data, and the other (non-timeseries) data in the model to produce a recommendation for optimal DER investment. The TSP matrix informs the model which timesteps to consider as part of the solution. The ES model solution time decreases from the benchmark BS exponentially with decreases in the time-steps considered.

The user can specify DER or microgrid technologies or capacities that should be considered. In such a case, the solution provided by ES 102, specifically, the recommended DER types or energy technologies and sizes are used to modify the DER capacity that was specified by the user or generated by AI. The new capacity limits can either be a fixed capacity which the model must consider (if the user wants to have a certain fixed number) or a minimum capacity, upon which the model can increase if needed or is more optimal. The modified forced capacity will be at least the user specified amount, if the user specifies such a capacity. For microgrids, or energy systems, subject to islanding events, or tight constraints on energy imports, a minimum investment must be used.

The TSP matrix is modified such that it represents the time-steps present in the original dataset. The full time-series data, the static inputs, and the modified forced DER specifications as determined by ES 102 are then used as input to BS 104. The ES solution provides a starting point for BS 104, where the closer the approximation, the less runtime will be required. BS 104 optimizes additional DER needed to meet the energy balance of the original model, or to provide a greater degree of optimality, as well as optimize the operation of the DER.

The economic and technical outputs of the BS, such as the final DER size, selection, placement, and operation, as well economic indicators, amongst others, are recorded in a database(s) 105 or other storage measure.

Problem Formulation

Figure 4:
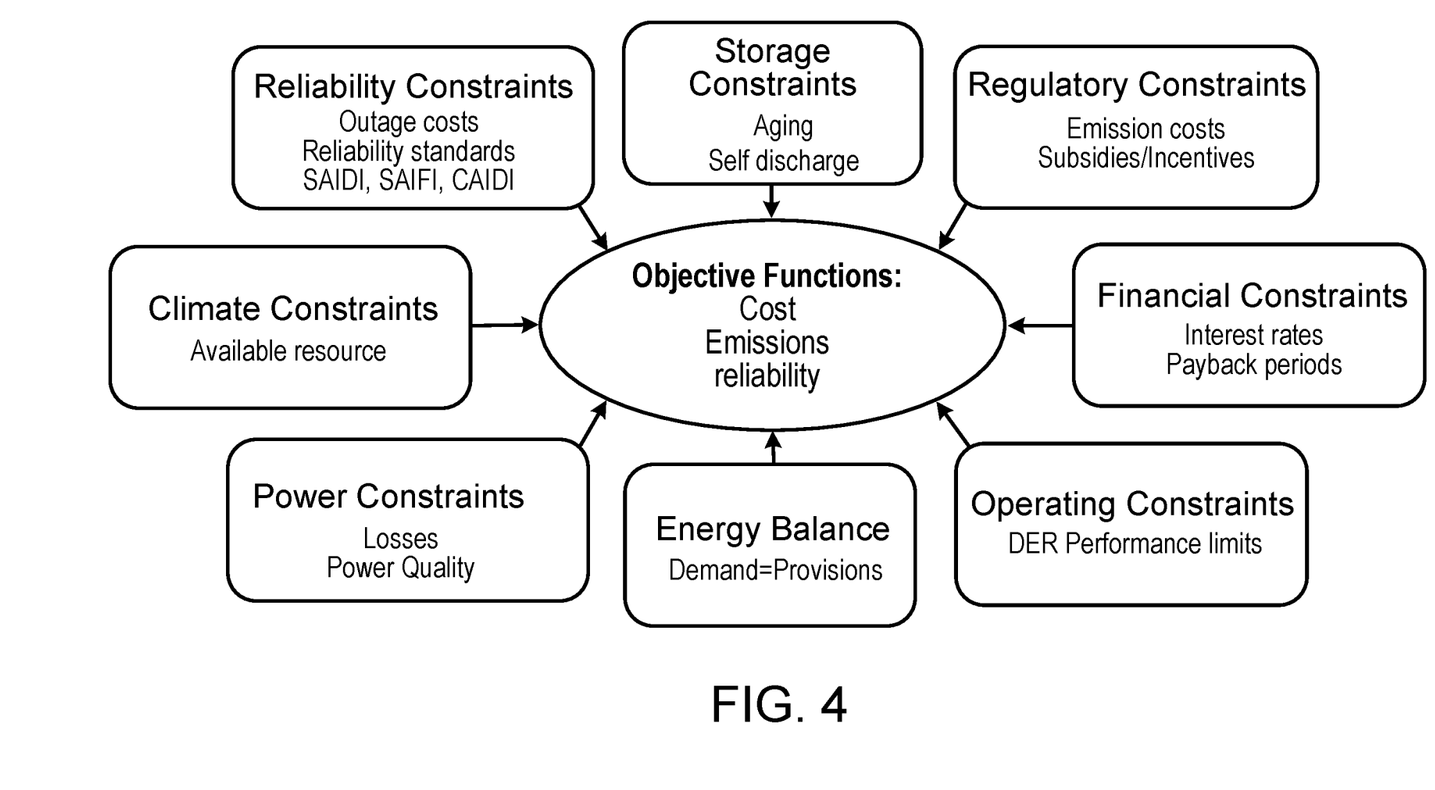
FIG. 4 is a representation of a typical model used for the design of DER, microgrid, and Energy system in planning methods. The model considers several inputs and attempt to design the system by reducing the objective function, according to an embodiment.

The method relies on the same underlying problem being solved in both the ES and BS, considering data of different resolutions. To accomplish this, we employ a single flexible model formulation, which can guarantee the same problem is being solved, regardless of the time-set of the data considered. The use of the same problem formulation provides the best match between the ES and BS, which has an impact on optimality and run-time savings. An example of a problem formulation is given in FIG. 4.

The model represents time-steps using sets of indices on every time dependent variable, indicating the variable value at each second, minute, hour, day, month, and year of the solution. These indices can be manipulated, to allow the model solve the problem for different samples of input data. The projection matrix, TSP, is used to relate the timesteps that are being considered in the model.

For example, assume a dataset of hourly resolution data for ever day of a single year. For this original dataset, the projection matrix has a value of 1, for each day and hour that occurs in a given month. For example, days 1-28 in February will have a value of 1, while days 29-31 will have a zero, for a non-leap year. Next, imagine the data is down-sampled to simply remove every other day in the dataset. Now, for data that was removed from the set, the corresponding entry in TSP takes a value of zero. For February, this means entries in TSP representing days 2, 4, 6, . . . , 28 take a value of zero, while entries for days 1, 3, 5, . . . , 27 keep a value of 1. If we now assume that each remaining day is assumed to occur twice, to make up for the missing days, then the entries for days 1, 3, 5, . . . , 27 would now take a value of 2 in the matrix TSP.

If less time-steps are considered, it may no longer be possible to link the time-steps of the model. For variables which rely on past times steps to inform current operation, i.e. storage state of charge, new constraints must be developed which link the timesteps that remain.

Example Process

Figure 7:
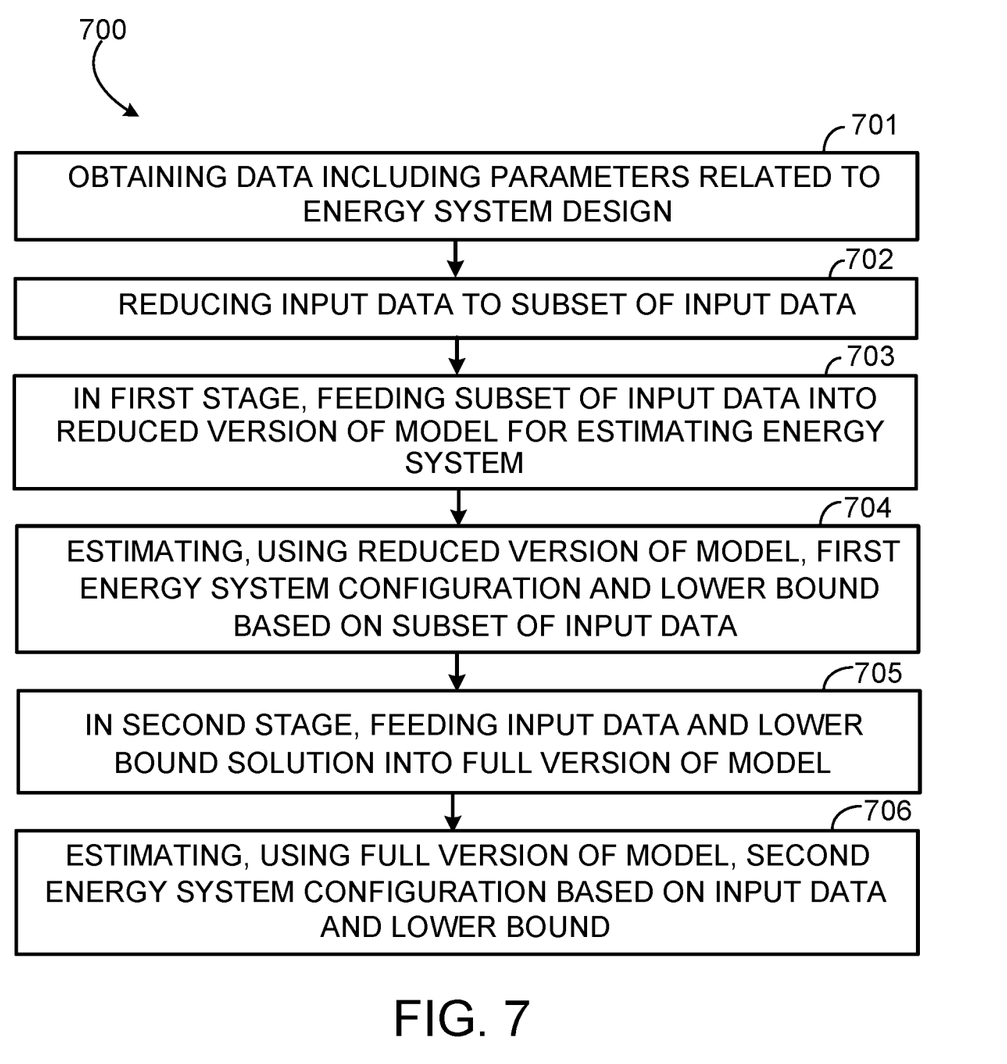
FIG. 7 is an example staged hybrid planning process, according to an embodiments.

FIG. 7 is an example staged hybrid planning process 700, according to an embodiments. Process 700 can be implemented by, for example, the system 800 shown in FIG. 8.

Process 700 comprises the steps of obtaining input data including a plurality of parameters related to an energy system design (701), reducing the input data to a subset of the input data (702), feeding, in a first stage, the subset of input data into a reduced version of a model for estimating an energy system configuration (703), estimating, using the reduced version of the model, a first energy system configuration and a lower bound solution for the first energy system configuration based on the subset of input data (704), and feeding, in a second stage following the first stage, the input data and the lower bound solution into a full version of the model (705), and estimating, using the full version of the model, a second energy system configuration using the input data and the lower bound solution (706).

Example System

Figure 8:
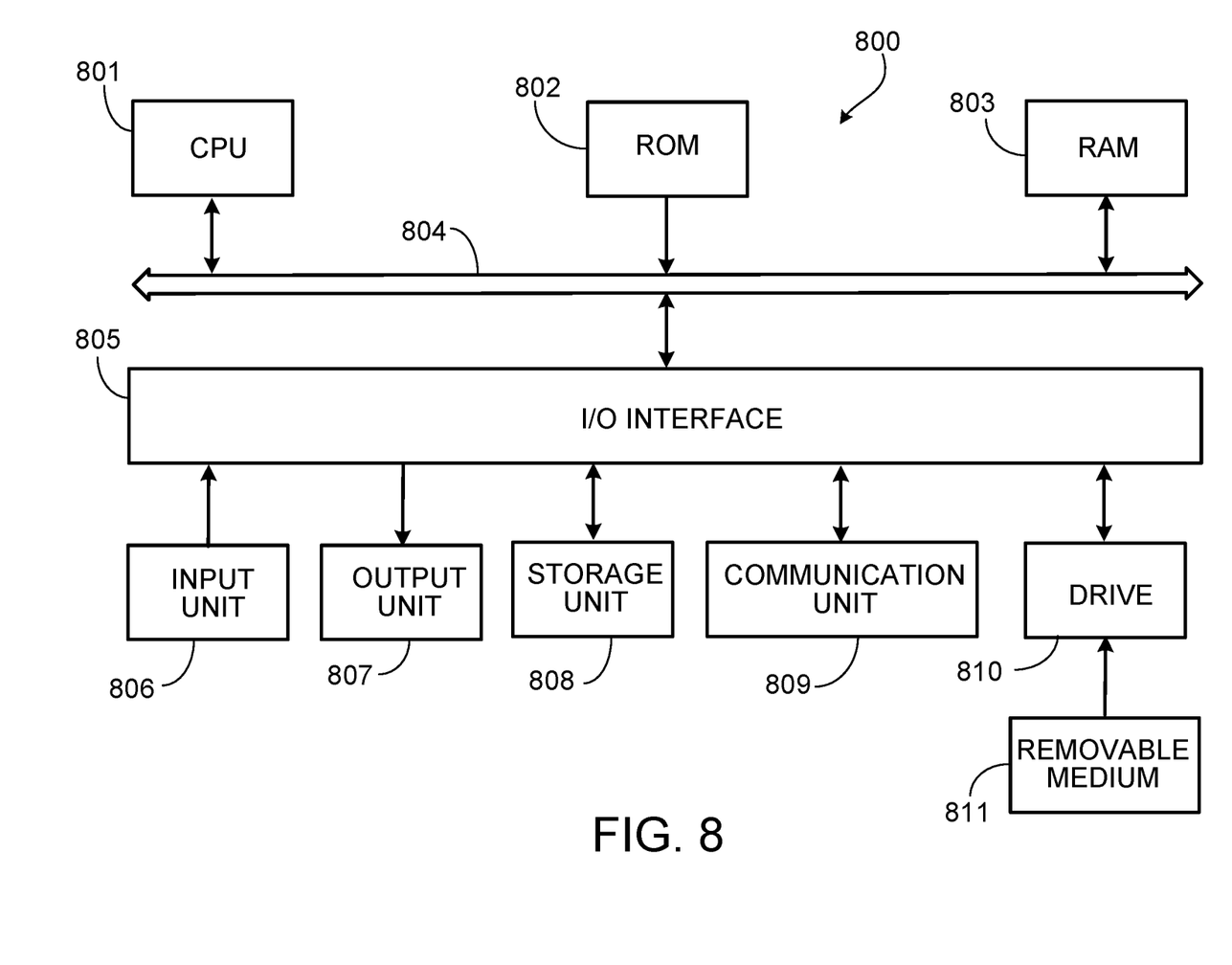
FIG. 8 is an example system for implementing the features and methods described in reference to FIGS. 1-7.

FIG. 8 shows a block diagram of an example system for implementing the features and processes described in reference to FIGS. 1-7, according to an embodiment. System 800 includes any devices that are capable of playing audio, including but not limited to: smart phones, tablet computers, wearable computers, vehicle computers, game consoles, surround systems, kiosks.

As shown, the system 800 includes a central processing unit (CPU) 801 which is capable of performing various processes in accordance with a program stored in, for example, a read only memory (ROM) 802 or a program loaded from, for example, a storage unit 808 to a random access memory (RAM) 803. In the RAM 803, the data required when the CPU 801 performs the various processes is also stored, as required. The CPU 801, the ROM 802 and the RAM 803 are connected to one another via a bus 804. An input/output (I/O) interface 805 is also connected to the bus 804.

The following components are connected to the I/O interface 805: an input unit 806, that may include a keyboard, a mouse, or the like; an output unit 807 that may include a display such as a liquid crystal display (LCD) and one or more speakers; the storage unit 808 including a hard disk, or another suitable storage device; and a communication unit 809 including a network interface card such as a network card (e.g., wired or wireless).

In some implementations, the input unit 806 includes one or more microphones in different positions (depending on the host device) enabling capture of audio signals in various formats (e.g., mono, stereo, spatial, immersive, and other suitable formats).

In some implementations, the output unit 807 include systems with various number of speakers. As illustrated in FIG. 8, the output unit 807 (depending on the capabilities of the host device) can render audio signals in various formats (e.g., mono, stereo, immersive, binaural, and other suitable formats).

The communication unit 809 is configured to communicate with other devices (e.g., via a network). A drive 810 is also connected to the I/O interface 805, as required. A removable medium 811, such as a magnetic disk, an optical disk, a magneto-optical disk, a flash drive or another suitable removable medium is mounted on the drive 810, so that a computer program read therefrom is installed into the storage unit 808, as required. A person skilled in the art would understand that although the system 800 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 809, and/or installed from the removable medium 811, as shown in FIG. 8.

Generally, various example embodiments of the present disclosure may be implemented in hardware or special purpose circuits (e.g., control circuitry), software, logic or any combination thereof. For example, the units discussed above can be executed by control circuitry (e.g., CPU 801 in combination with other components of FIG. 8), thus, the control circuitry may be performing the actions described in this disclosure. Some aspects may be implemented in hardware, while other aspects may be implemented in firmware or software which may be executed by a controller, microprocessor or other computing device (e.g., control circuitry).

While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method comprising:
  obtaining, with at least one processor, input data including a plurality of parameters related to an energy system design;
  reducing the input data to a subset of the input data;
  in a first stage:
    feeding, with the at least one processor, the subset of input data into a reduced version of a model for estimating an energy system configuration;
    estimating, with the at least one processor and using the reduced version of the model, a first microgrid configuration and a lower bound solution for a first energy system configuration based on the subset of input data; and
  in a second stage following the first stage:
    feeding, with the at least one processor, the input data and the lower bound solution into a full version of the model; and estimating, with the at least one processor and using the full version of the model, a second energy system configuration based on the input data and the lower bound solution.

\* \* \* \* \*